United States Patent [19]

Wilson

[11] Patent Number: 4,759,854
[45] Date of Patent: Jul. 26, 1988

[54] GRIT TRAP

[75] Inventor: Reginald A. E. Wilson, Stourbridge, United Kingdom

[73] Assignee: Jones & Attwood Limited, England

[21] Appl. No.: 99,639

[22] Filed: Sep. 23, 1987

Related U.S. Application Data

[63] Continuation of Ser. No. 914,590, Oct. 2, 1986, abandoned, which is a continuation of Ser. No. 662,437, Oct. 15, 1984, abandoned.

[30] Foreign Application Priority Data

Nov. 2, 1983 [GB] United Kingdom ................. 8329213

[51] Int. Cl.⁴ .............................................. C02F 1/24
[52] U.S. Cl. ................... 210/703; 210/787; 210/801; 210/221.2; 210/512.3; 209/164; 209/170; 209/211
[58] Field of Search ....................... 209/164, 170, 211; 210/221.2, 512.1, 512.3, 787, 801

[56] References Cited

U.S. PATENT DOCUMENTS

| | | | |
|---|---|---|---|
| 1,669,820 | 5/1928 | Grant | 209/211 |
| 1,996,547 | 4/1935 | Mason | 209/211 |
| 2,020,617 | 11/1935 | Nordell | 210/512.3 |
| 3,129,173 | 4/1964 | Schulze | 209/211 |
| 3,353,340 | 11/1967 | Carsey | 210/512.1 |
| 4,146,468 | 3/1979 | Wilson | 210/512.1 |
| 4,451,366 | 5/1984 | Smisson | 210/512.1 |

FOREIGN PATENT DOCUMENTS

| | | | |
|---|---|---|---|
| 1146814 | 9/1952 | Fed. Rep. of Germany | 210/512.1 |
| 1459503 | 4/1971 | Fed. Rep. of Germany | 210/512.3 |
| 45-12199 | 2/1970 | Japan | 210/512.3 |
| 830531 | 3/1960 | United Kingdom | 210/512.3 |

Primary Examiner—Ernest G. Therkorn
Attorney, Agent, or Firm—Andrus, Sceales, Starke & Sawall

[57] ABSTRACT

This invention relates to a grit trap which is intended for use in removing grit from a flow of sewage. The grit trap is of the kind which includes a settlement chamber which has an inlet through which the flow of sewage can flow and an outlet from which treated sewage can flow. There is also provided a grit storage chamber which is disposed between the settlement chamber and in which in use the separated grit will collect, the settlement chamber having a mixing device for promoting a desired motion to the flow of sewage entering the settlement chamber. In accordance with the invention said mixing device comprises a disc 25 which is provided with a plurality of generally radially extending blades, said disc being located just above the upper end of the grit storage chamber.

3 Claims, 1 Drawing Sheet

GRIT TRAP

This application is a continuation of copending application Ser. No. 06/914,590 filed Oct. 2, 1986, now abandoned, which in turn was a continuation of copending application Ser. No. 06/662,437 filed Oct. 15, 1984, now abandoned.

This invention relates to an apparatus for separating grit from a flow of sewage or other liquids, such apparatus being commonly known as a grit trap, the term "grit" being taken also to include any other solid material that is heavier than the liquid in which it is transported. Thus, a flow of sewage which is to be treated will commonly include organic material and grit in addition to other materials and it is desirable to separate the grit from the flow before the organic material itself is treated. To this end it is known to provide a grit trap which comprises a settlement chamber having an inlet for a flow of sewage from which grit is to be removed and an outlet through which sewage from which grit has been separated can flow, said settlement chamber having a mixing device to promote a desired motion to the flow of sewage entering the settlement chamber and being connected to a grit storage chamber in which in use the separated grit will collect, there being also provided a pump having a suction tube which is arranged to remove grit collected in said grit storage chamber.

The object of the present invention is to provide an improved form of grit trap which will operate in a more efficient manner than hitherto known grit traps.

In accordance with the invention there is provided a grit trap which comprises a settlement chamber having an inlet for a flow of sewage from which grit is to be removed and an outlet through which sewage from which grit has been separated can flow, said settlement chamber having a mixing device to promote a desired motion to the flow of sewage entering the settlement chamber and being connected to a grit storage chamber in which in use the separated grit will collect, there being also provided a pump having a suction tube which is arranged to remove grit collected in said grit storage chamber, characterised in that said mixing device comprises a disc which is rotatable about a vertical or substantially vertical axis and which is provided on its upper surface with a plurality of upstanding blades, said disc being positioned a short distance above the upper end of the grit storage chamber.

Preferably the bottom portion of the settlement chamber is so shaped in relation to the diameter of said disc that a relatively small annular gap is formed between the periphery of the disc and the adjacent part of the interior wall of said bottom portion of the settlement chamber, the separated grit passing, when the grit trap is in use, through said annular gap into the grit storage chamber. Preferably, the aforesaid interior wall of the bottom portion of the settlement chamber is of frustoconical configuration. Furthermore, the bottom surface of the inner end of the aforesaid sewage inlet is preferably formed so that it slopes downwardly in the direction of the sewage flow.

BRIEF DESCRIPTION OF THE DRAWINGS

The invention will now be more particularly described with reference to the accompanying drawing wherein.

DESCRIPTION OF THE PREFERRED EMBODIMENT

Figure 1:
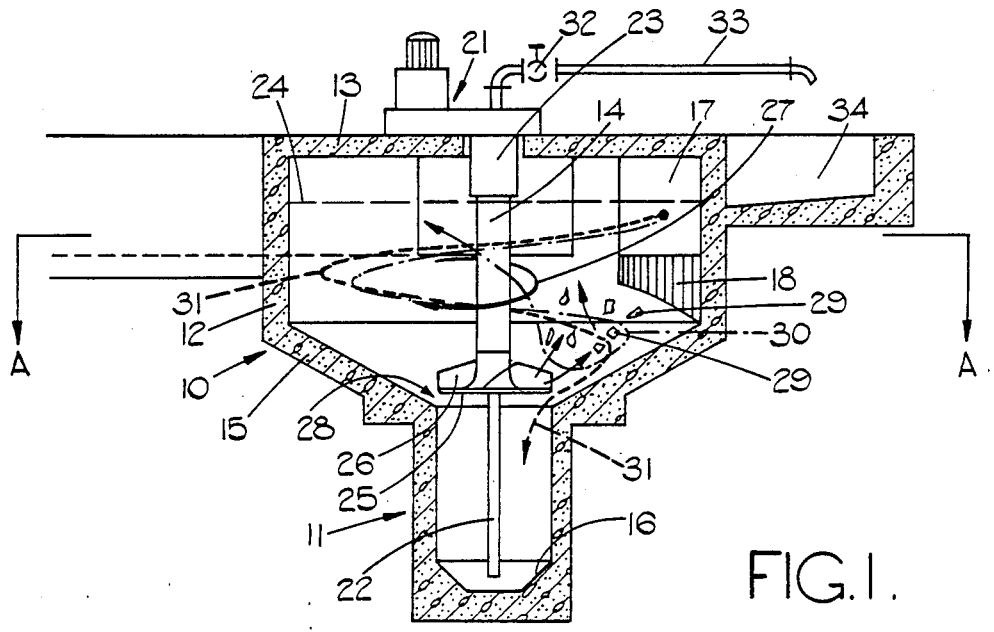
FIGS. 1 and 2 are respectively a sectional elevation and a sectional plan view (taken on the line A—A of FIG. 1) of one example of a grit trap in accordance with the invention.

Referring now to the drawing there is shown therein a grit trap for use in removing grit from a flow of sewage, said grit trap comprising a settlement chamber 10 together with a grit storage chamber 11 which is disposed beneath the chamber 10, said two chambers being in communication with each other as shown in FIG. 1. Conveniently the chambers may be formed integrally with each other in concrete.

The upper portion 12 of the settlement chamber 10 is conveniently formed of generally cylindrical configuration on which is supported a bridge 13 having a central aperture through which a shaft assembly 14 can extend. The lower portion 15 of said settlement chamber 10 is of frusto-conical configuration and the bottom of said portion 15 is connected to the top of the grit storage chamber 11 through a common opening. The latter is also of generally cylindrical configuration but is shaped so that the bottom part of its internal surface 16 is formed to a frusto-conical configuration.

Figure 2:
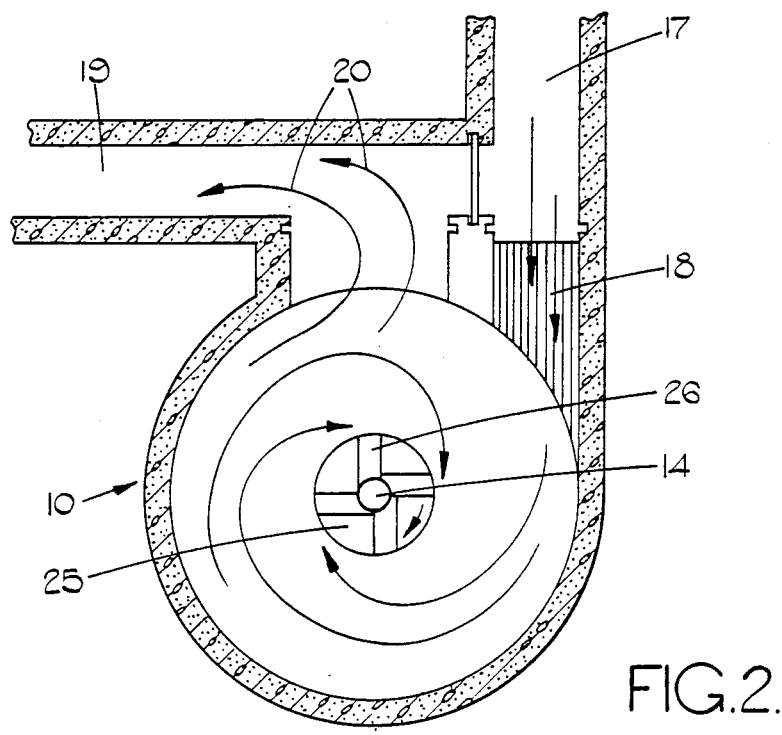

There is also provided an inlet channel 17 which is connected to the upper part of the settlement chamber 10 and through which a flow of sewage which is to be treated can pass, in a generally tangetial direction, into the upper part of the settlement chamber, the floor of the inner end of said inlet channel 17 being inclined downwardly in the direction of flow before the inlet channel enters the periphery of the settlement chamber, such downwardly inclined portion being indicated by reference numeral 18. There is also provided an outlet channel 19 which is connected to the settlement chamber 10 so as to receive de-gritted sewage which has passed through the grit trap. Sewage entering the settlement chamber 10 via the inlet channel 17 will flow around the settlement chamber in a generally clockwise direction before passing out through the outlet channel 19 as indicted by the arrows 20 in FIG. 2 and as will be seen from FIG. 2 the outlet channel 19 is spaced from the inlet channel 17 in the direction of rotation by an angle which is represented by somewhat more than three quarters of a revolution.

Supported on the top or bridge 13 extending across the top of the settlement chamber 10 is a gear head and drive unit generally indicated by reference numeral 21 which serves to drive the hollow shaft assembly 14 through which passes an air lift pump which consists of a tube 22 which extends downwardly into the grit storage chamber 11 so that its lower end is positioned close to the bottom of said storage chamber. There is also conveniently provided an air bell 23 which together with appropriate seals prevents the ingress of liquid into the gearhead and drive unit. The normal level of liquid in the grit trap is indicated by dotted line 24.

The aforesaid hollow shaft assembly 14 serves to support at its lower end a device for imparting the desired motion to the flow of sewage entering the grit trap, said device comprising a disc 25 which is provided on its upper surface with a plurality of generally radially extending blades 26 which thus project upwardly from the disc. The direction of rotation of said disc is indicated in FIG. 1 by the solid arrow 27. It will also be noticed from FIG. 1 that the bladed disc 25 is positioned close to the lower end of the lower portion 15 of the settlement chamber 10 so that it will be only a short distance above the upper end of the grit storage chamber 11. Moreover the size of the disc 25 in relation to the diameter of the grit storage chamber 11 is such that only a small annular gap 28 exists between the periphery of the disc and the adjacent part of the interior wall of said portion 15.

In operation the flow of sewage entering the settlement chamber from the inlet channel 17 in a generally tangential direction will be caused to rotate within the chamber in a clockwise direction as previously mentioned and the disc 25 will assist in maintaining such rotation, the flow within said settlement chamber being maintained so far as possible in a laminar condition. The velocity of the flow however is such that the grit particles such as particles 29 (see FIG. 1A) will begin to settle and move towards the sloping floor of the lower portion 15 of the settlement chamber. Furthermore as soon as such particles settle below the bottom of the outlet channel 19 they will be trapped within the settling chamber. On the other hand the lighter organic particles that are included in the flow of sewage do not settle so readily and these remain generally in suspension to be carried by said flow into the outlet channel 19 for further treatment. If however there are any organic particles which have a settling velocity similar to the settling velocity of the grit then they will move onto the aforesaid sloping floor of the lower portion 15 of the settlement chamber and thence downwardly towards the grit storage chamber 11 some of these organic particles may eventually pass into the grit storage chamber through the annular gap 28 but they will in fact be a small proportion of the total quantity of organic particles.

Any organic particles with an intermediate settling velocity that may not have been carried round immediately into the outlet channel 19 will tend to move downwardly towards the disc or rotor 25 but will then come under the influence of the latter which is so arranged that a natural vortex is formed which creates a gentle upward flow from the periphery of the disc and thus any organic particles which come under the influence of this vortex will be lifted upwardly towards the top of the settlement chamber 10 and thence into the outlet channel 19. The path of such organic particles is shown by the chain dotted line indicated by reference numeral 30 in FIG. 1. On the other hand the path taken by the grit which settles from the flow of fluid is indicated in FIG. 1 by the dotted line 31. The smooth underside of the disc 25 allows the liquid in the grit storage chamber 11 to remain quiescent so that the grit particles will settle at the bottom of the grit storage chamber 11 on and around the frusto conical surface 16.

Ideally, all of the organic particles will be caught in the upward spiral flow of liquid in the vortex created by the disc 25 and thus will pass out of the grit trap into the outlet channel 19. However, if some organic particles (dependent upon settling rate) do pass through the annular gap 28 into the grit storage chamber then they can be removed by using the aforementioned air lift pump in reverse as an air scour by closing a control valve 32 in a horizontal outlet tube 33 connected to the pump. Compressed air will now be discharged from the lower end of the vertical tube 22 at a reduced flow rate so as gently to air wash and lift the grit particles to wash out any organic particles that may also have collected in the chamber 11. This reduced air flow is sufficient to cause only said organic particles to rise towards the annular gap 28 whilst the grit particles themselves remain in the grit storage chamber. The air scoured organic particles will now come under the influence of the disc 25 and will therefore be lifted further in the spiral flow of liquid created by the disc 25 for eventual removal through the outlet channel 19.

When the aforementioned air scour is complete, the control valve 32 is opened and pressurised air is then caused to flow so as to rise upwardly in the air lift tube 22, creating suction therein. The grit collected in the grit storage chamber 11 will now be lifted from the bottom of said chamber and will then pass outwardly through said control valve and the horizontal tube 33 into a collecting trough 34 for drainage and subsequent disposal.

What is claimed is:

1. A method of separating grit from a flow of sewage containing organic materials and grit comprising providing (a) a settlement chamber having an inlet for a flow of sewage containing organic materials and grit and having an outlet through which sewage and organic materials from which grit has been separated can flow, the lower portion of said settlement chamber being frusto-conical and merging downwardly into a grit storage chamber through a common opening and (b) a rotatable disc disposed slightly above said grit storage chamber closely adjacent said common opening to provide a small annular gap between the periphery of the disc and the interior of the settlement chamber, admitting a flow of sewage containing organic materials and grit into said settlement chamber, rotating said disc to create an upward flow of fluid in said settlement chamber above the periphery of said disc to effect an upward movement of organic materials whilst permitting grit to pass downwardly into and through said annular gap into said grit storage chamber and removing by suction from said storage chamber as and when desired grit collected therein, such removed grit being discharged outside said settlement chamber, the flow of sewage containing said organic material but from which grit has been removed then passing through said outlet.

2. A method as claimed in claim 1 wherein any organic materials which have inadvertently fallen into said grit storage chamber are expelled therefrom by admitting a flow of air into said grit storage chamber when desired, the rate of such air flow being controlled to provide a gentle scouring action of the grit particles within the grit storage chamber so as to lift and wash out from said chamber only said organic material therefrom through said annular gap.

3. A method as claimed in claim 2 wherein removal of grit from the grit storage and removal of any organic materials inadvertently falling into said grit storage chamber are effected by an air pump which is used in a suction mode when it is required to remove grit and in a reverse mode in which air is admitted into the grit storage chamber when it is required to remove organic materials.

* * * * *